United States Patent [19]

Vasseur et al.

[11] 4,286,743
[45] Sep. 1, 1981

[54] METHOD OF SOLDERING A FIRST VITREOUS COMPONENT TO A SECOND COMPONENT

[75] Inventors: Jean-Pierre Vasseur, Brussels; Michel Laurent, Nivelles; Jean-Joseph Loriau, Fleurus; Andre Delhaute, Chatelineau, all of Belgium

[73] Assignee: BFG Glassgroup, Paris, France

[21] Appl. No.: 952,129

[22] Filed: Oct. 17, 1978

[30] Foreign Application Priority Data

Oct. 25, 1977 [GB] United Kingdom ............... 44347/77

[51] Int. Cl.³ .............................................. B23K 1/08
[52] U.S. Cl. ..................................... 228/124; 228/188
[58] Field of Search ............... 228/121, 122, 123, 124, 228/188; 428/630; 136/89 EP

[56] References Cited

U.S. PATENT DOCUMENTS

| | | | |
|---|---|---|---|
| 2,149,246 | 2/1939 | Zimmerman et al. ............... | 228/121 |
| 2,330,292 | 9/1943 | Knight et al. ..................... | 228/121 X |
| 2,508,079 | 5/1950 | Spahn .............................. | 228/122 X |
| 2,523,155 | 9/1950 | Shoupp ............................ | 428/630 X |
| 3,164,795 | 1/1965 | Luebbe ............................ | 136/89 EP |

OTHER PUBLICATIONS

Manko—*Solders and Soldering*, McGraw-Hill, New York, N.Y., 1964, pp. 290-291.
*Soldering Manual*, American Welding Society, New York, N.Y., 1959, p. 57.

*Primary Examiner*—Gil Weidenfeld
*Assistant Examiner*—Kenneth J. Ramsey
*Attorney, Agent, or Firm*—Cushman, Darby & Cushman

[57] ABSTRACT

A method of soldering a first, vitreous component for example a sheet to at least one second component which is vitreous or metallic, in which the or each vitreous component is metallized in the joint region(s), the components are assembled together in the required relationship where they may be held by a clamp and the joint region(s) of the assembly is or are dipped in a bath of molten solder to bond it together as a unit. Such a unit may be constituted as an envelope containing one or more electrical circuit components, as a fluid flow directing unit or as a pane for incorporation into a leaded window.

22 Claims, 15 Drawing Figures

METHOD OF SOLDERING A FIRST VITREOUS COMPONENT TO A SECOND COMPONENT

The present invention relates to a method of soldering a first, vitreous component to a second component which is vitreous or metallic.

The word 'vitreous' is used herein to denote glass and vitrocrystalline material which is a material which can be made by subjecting a glass to a treatment such as to induce the formation of one or more crystalline phases therein.

Solder-bonding of vitreous components to other components is useful in many fields. A specific example lies in the field of multiple glazing units in which two or more vitreous sheets are held in spaced relation by one or more metallic spacer members soldered to metallised margins of the vitreous sheets.

In the field of multiple glazing units it has hitherto been common practice to form the necessary solder joints using a soldering iron. This is a time consuming process and requires highly skilled labour. For these reasons it is also costly. It has also been proposed to precoat the metallised margins of two glass sheets and metallic spacer strip with solder and to subject the assembly to the action of a reducing flame to melt the solder in situ. It has been found that for best results, that is to form solder joints which will resist aging and preserve the sealing of the interior space of the unit, it is often necessary to make a finishing pass along the joint lines with a soldering iron. Again this is time consuming.

The present invention is also useful where it is desired to seal together two vitreous sheets without an intervening spacer member, for example to protect a coating, e.g. a conductive coating which has been applied to a face of one of the sheets. Again this has hitherto been done by passing a soldering iron fed with solder around the edges of the unit.

It is the principal object of the present invention to provide a method for satisfactorily connecting a vitreous component to a second component which can be performed more rapidly than the prior art processes outlined above.

According to the present invention there is provided a method of soldering a first, vitreous component to at least one second component which is vitreous or metallic, characterised in that the or each vitreous component is metallised in the region(s) of the solder joint(s), the components are assembled together in the required relationship and the joint region(s) of the assembly is or are dipped in a bath of molten solder.

The invention is applicable to the manufacture of multiple glazing units, for example double glazing units, comprising sheets of glass held spaced apart by metallic spacer members, and particularly to the manufacture of hermetically sealed multiple glazing units. The invention is also applicable to the manufacture of other units comprising two or more sheets of which at least one is vitreous which are held apart by one or more metallic spacer members soldered to metallised or metallic portions of the sheets.

The invention is equally applicable to units in which metallised portions of a vitreous sheet are soldered directly to another sheet.

The invention may also be used in other fields, for example to attach door furniture to a glass door.

The invention is not limited to cases where said vitreous component is a sheet. For example artistic creations may be made using a metallised vitreous component of any shape to whose metallising coating is soldered one or more other components.

It has been found that merely by immersing the joint region(s) in molten solder it is possible to form a solder joint which can be of extremely high quality. It will of course be appreciated that the surfaces to be soldered should be clean, but this is true of any soldering operation, and also that their composition and that of the solder used should be such as to ensure wetting by the solder so that a high quality solder joint can be formed. The invention provides an extremely simple way of soldering a metallised vitreous component to another metallic or metallised component. Furthermore, the process according to the invention can be performed extremely rapidly. As an example of the reduction in time which can be afforded by the present invention, the manufacture of a double-paned hollow glazing unit may be cited. The whole of such a rectangular glazing assembly may be immersed in a bath of molten solder for say 10 to 15 seconds in order to effect bonding of the unit, whereas to form the unit in the conventional way, eight straight-line joints would require to be made and each of these would require considerably longer than 15 seconds to form using a soldering iron.

The invention also enables a plurality of said second components to be soldered to a vitreous component in a single step.

Preferably, said first vitreous component is a sheet.

The invention affords particular advantages in embodiments thereof in which such sheet is joined to a said second component at an elongate joint region extending along substantially the full length of at least one side edge margin of the sheet, which region is dip-soldered as a whole. Such an elongate joint can be formed very rapidly by operating in accordance with the invention, and it can be formed to a good uniform quality without the requirement for highly skilled labour.

Advantageously, said second component(s) is or are secured to such sheet by a solder joint extending around substantially the whole margin of the sheet. The advantages conferred by this preferred feature of the invention will depend on the nature of the second component(s). If the second component is a sheet, then this feature provides a very simple way of rapidly uniting the two sheets. If the second component is a spacer frame comprising one or more metallic spacer members by which the first sheet is to be held in spaced relation from a second sheet, then this feature provides a quick and useful stage in the manufacture of such a multiple sheet unit.

A said bath of solder is advantageously maintained at a temperature of between 20° C. and 100° C. (for example between 40° C. and 50° C.) above the liquidus temperature of the solder used in the bath.

The solder used to bond together the two said elements is preferably a lead/tin alloy which optionally contains bismuth.

Alloys containing 60% to 35% lead (by weight) are particularly suitable so as to give a low melting point and low cost.

Tin-lead-bismuth solders when used preferably contain at least 15% tin and at most 40% bismuth (by weight).

The following are examples of solder compositions which have been found particularly suitable (parts by weight):

| Sn | 63 | 60 | 50 | 23 | 42 | 46 |
|----|----|----|----|----|----|----|
| Pb | 37 | 40 | 50 | 40 | 50 | 50 |
| Bi | — | — | — | 37 | 8 | 4 |

Preferably flux is applied to the or each joint region prior to its being dipped in solder. This facilitates the formation of high quality solder joints. Preferably the flux used is a resin flux which is non-corrosive.

Preferably, at least one said component is surface-coated with solder at least over its joint region(s) prior to its being dipped in said bath of molten solder. This also promotes the formation of a high quality solder joint, since this makes the joint region(s) more easily wettable by the solder in the bath. It is especially convenient if such solder coating is effected using a solder alloy of the same composition as the solder of said bath. This may readily be done by spraying or dipping with the solder alloy, depending on the nature of the component to be coated.

Advantageously, said molten solder is caused or allowed to pass between the components being joined since this allows a strong bond to be formed. In the most preferred embodiments of the invention, said solder deposits wholly or mainly between the components being joined since this is more economical of solder, but in certain embodiments of the invention, for example where a flat metallic spacer strip is to be soldered to a vitreous sheet as a step in the manufacture of a multiple glazing unit, it is preferred to form a solder bead joint to impart the requisite strength to the joint.

The invention is particularly useful for the manufacture of hollow panels, and accordingly the invention includes methods wherein said first, vitreous component is a sheet, characterised in that the or each said second component is a metallic spacer member by means of which such vitreous sheet is to be held in spaced relation from a second sheet. Such a process provides a very rapid and reliable way of securing one or more spacer members to a vitreous sheet as a step in the manufacture of hollow panel units.

As has previously been stated, multiple sheet units of the soldered type such as multiple glazing units have hitherto been made by attaching flat spacer strips edgewise between pairs of vitreous sheets, these strips being soldered by solder beads to metallised margins of the sheets.

The formation of solder-bead joints is a highly skilled and time consuming process. It has been common practice in the industry to apply a leaden spacer strip to one sheet and to supply solder along the joint line melting it in situ using a soldering iron to form a bead joint. The spacer is then joined by a similar bead joint to a second sheet to form a double glazing unit. In order to get a well-formed bead, it is often necessary to make two or even three passes of a soldering iron along the joint. Even then, notwithstanding that a secure, bubble and dirt free joint is formed, the solder bead may well be irregular in that its cross-sectional area (though not perhaps its shape) varies along the joint. Thus the distance by which the solder in the bead encroaches on a main face of the spacer will vary along the spacer so that it will be differentially buttressed along its length. This will give rise to stress concentrations when flexural forces are exerted on the spacer strip so that local fractures are apt to occur. This is especially so when the product is exposed to differential temperature conditions during use, such as in the case of glazing units or heat-exchange (e.g. air-conditioning) assemblies.

For example, such a heat exchange unit may comprise three or more sheets of which successive pairs of sheets are each held spaced apart by two or more spacers to define at least one through passage for fluid material.

There are several ways in which such fractures can occur. For example the spacer itself may crack in the region of the joint, or it may tear away from the solder bead: the solder bead may rupture or tear away from the sheet, or surface portions of the vitreous sheet may flake off.

Such fractures of course tends to weaken the whole unit. Moreover in the case of hermetically sealed units, such fracture has the serious effect of allowing atmospheric moisture to penetrate the joints and condense on the interior of the units. This is of course highly objectionable in the case of transparent glazing units. The presence of leaks in the joints of a heat-exchange assembly will reduce its efficiency.

Thus it is usually important to multiple sheet unit manufacturers that units supplied by them shall have effective air-tight solder joints when installed. Indeed, many customers demand a guarantee that faults of this kind will not occur for at least a certain minimum period.

It is especially suitable to form all the soldered joints in a hollow panel unit by dipping, and accordingly, preferred embodiments of the present invention provide a method for manufacturing a hollow panel unit comprising a first, vitreous sheet and at least one other sheet held in spaced relation by one or more metallic spacer members intervening between and soldered to metallic portions of the or each successive pair of sheets, characterised in that the or each said spacer comprises a web having a width greater than its thickness and in that the sheets are assembled together with the spacer or spacers between them so that the width or widths of the spacer web or webs between the or each said pair of sheets governs or govern the sheet separation, whereafter at least the joint regions of such assembly are dipped in said bath.

The solder joints of a said unit may be formed by immersing the whole assembly in a bath of molten solder.

Alternatively, such joints may be formed one or more at a time, for example by successively dipping the margins of the assembly into molten solder. The margins of the assembly may be dipped into the solder while the sheets are inclined or held vertically.

Preferably, the sheets are held vertically while the margins are withdrawn from the solder in inclined orientation. This enables excess solder to run off more easily.

In order to form a hollow glazing panel, preferred embodiments of the invention provide that the or each said other sheet is made of vitreous material.

Preferably, a said spacer is formed by or from a flat metal strip. This enables the strip material to be conveniently stored on reels prior to use.

In certain embodiments of the invention a said spacer has at least one flange portion for soldering in face-to-face relation with a said sheet. This renders the unit more stable after assembly and prior to soldering.

The flange or flanges may for example be formed by bending or folding a flat metal strip.

Various metals can be used for forming spacers for use in hollow panel units according to the invention. The useful metals include elements and alloys. For example a conventional leaden strip may be used. Leaden strips may be of substantially pure lead, but often contain up to 5% by weight of antimony.

There are however certain materials which afford particular advantages.

Preferably, the or each said spacer has a modulus of elasticity (Young's modulus measured in compression) which is greater than 5000 kg/mm$^2$ and less than 20000 kg/mm$^2$.

Stresses are set up in the web of a spacer in the event of the joined sheets and therefore the opposed edges of the web being brought to different temperatures, and the elasticity modulus of a spacer is important because it influences the way in which these stresses may be accommodated. Such temperature differentials, of various and varying magnitude, are likely to occur when the unit is in use. The stresses may also be set up by differential contraction of the spacer and the sheets after soldering. Furthermore, the web(s) of the spacer(s) is or are well able to accommodate any flexural forces likely to be encountered when the unit is in use.

In especially advantageous embodiments of the invention, the unit includes at least one copper spacer. By using copper, it is possible to make spacers which not only possess a favourably high inherent flexibility and compression resistance but exhibit those properties over an appreciable temperature range. Moreover copper spacers are corrosion-resistant, have satisfactory thermal expansion characteristics and are solderable without difficulty.

In other very favourable embodiments of the invention, at least one spacer is used which is formed of an alloy containing by weight, at least 70% copper, the balance being of one or more metals selected from: nickel, aluminium, iron, and tin. Such alloys have a better resistance to atmospheric corrosion than pure copper and have similarly low sensitivity to variations in environmental temperature, but the relationship between their moduli of elasticity and their coefficients of thermal expansion, while being satisfactory, is not so good as that of copper as regards the ability of a spacer to accommodate differential thermal expansion of its edges or of an edge and the sheet to which it is attached. A very suitable copper-nickel alloy is one comprising 90% Cu and 10% Ni (percentages by weight). Particular mention should also be made of a copper-aluminium-iron alloy containing these elements in a ratio of 86:10:4 by weight and of a copper-tin alloy containing by weight 95.5% Cu and 4.5% Sn.

The corrosion resistance of Monel (Trade Mark) metal makes it particularly suitable for forming a spacer for use in a unit according to the invention.

Also spacers of other copper alloys can be used in carrying out the invention, e.g., spacers made of brass containing at least 80% by weight of copper.

One suitable brass contains by weight 80% copper and 20% zinc. Brass has a good resistance to corrosion.

Another category of alloys which can be used with advantage for forming the spacer(s) of units according to the invention comprises zinc-copper-titanium alloys.

Zintane (Trade Mark) type zinc-copper-titanium alloys are very suitable: such alloys may comprise by weight up to 1.5% Cu and 0.1–0.5% Ti, e.g., 0.5% Cu and 0.1% Ti.

Special mention is made of units according to the invention wherein the or each spacer is made of mild steel containing less than 0.3% carbon by weight. Steels warranting particular mention are steels containing less than 0.3% by weight carbon, of the following compositions in percentages by weight: 99.9% Fe and 0.1% C; 99.8% Fe and 0.2% C; 99.96% Fe and 0.04% C and steels with less than 0.3% by weight of carbon which contain 1% Mn or 1% Mn together with 0–2% Si.

When forming a solder joint by dipping, attention must be paid to the possibility of differential contraction of the spacer(s) and the sheets as they cool after the solder joints have been formed. The dipping method can be performed very quickly, so that it is in some cases possible that the vitreous sheet(s) may not have time to become significantly thermally expanded before the unit is withdrawn from the bath. On the other hand, because of the greater thermal conductivity of a metallic spacer, such a spacer will become thoroughly heated and will expand in the usual way. In order to limit the resulting difference in contraction on cooling to a level which will not unduly stress the completed unit it is accordingly preferred to use a spacer or spacers formed of an Invar (Trade Mark) alloy or a Kovar (Trade Mark) alloy. These alloys are very suitable because of their coefficients of thermal expansion at the temperatures in view.

Invar is a nickel-iron alloy containing about 36% by weight of nickel and has a very low efficient of thermal expansion.

Kovar is a Fe-Ni-Co alloy which has a coefficient of thermal expansion very similar to that of glass.

Typical compositions (parts by weight) for Kovar are

| Fe 54%; | Ni 29%; | Co 17% and |
|---------|---------|------------|
| Fe 54%; | Ni 28%; | Co 18%.    |

Alternatively, it is preferred to ensure that the or each vitreous component is heated prior to dipping in said bath of molten solder. Indeed when this feature is adopted, account can be taken of the coefficients of thermal expansion of the various materials and of the temperature of the solder bath, and in some circumstances it may be possible to pre-heat the vitreous component(s) to a temperature which will ensure that there will be substantially no stress due to differential contraction as the finished unit cools to ambient temperature.

Preferably, the or each such spacer has a modulus of elasticity which is greater than 8,000 kg/mm$^2$ and less than 14,000 kg/mm$^2$.

It has been found that when this feature is adopted, the resistance of a unit according to the invention to fatigue-aging is particularly favourable.

In certain units according to the invention the or each spacer bears a metallic coating of a composition different from the spacer. The use of a metallic coating enables the material of the spacer proper to be selected solely or primarily with regard to the requisite physical properties, because chemical properties such as corrosion resistance, if not possessed by such spacer material, can be conferred by applying an appropriate surface coating. Thus the invention includes units wherein the or each spacer bears on at least part thereof a coating which gives the spacer a greater resistance to corrosion and/or which facilitates soldering of the spacer.

Advantageously the or each spacer bears a tin coating. A tin coating is particularly effective for affording good corrosion resistance.

As an alternative or in addition to a tin coating, one or more spacers is or are preferably used which has or have been provided with a coating of a solder alloy. It is particularly advantageous to use a spacer having a tin coating and a superposed coating of solder alloy.

In the case that a tin coating is used it is suitable to form the coating electrolytically. If desired the coating can be melted in situ to eliminate any porosity or pinholing of the coating.

An easily solderable coating may be deposited on the strip by dipping the spacer in a bath of molten metal.

An alloy coating of the desired composition can be formed very easily in this way.

The present invention also provides a rapid and reliable way of bonding a vitreous sheet in face-to-face relationship with a second sheet, and accordingly, certain preferred embodiments of the invention provide a method wherein said second component is a sheet.

Such reference to face-to-face relationship is not to be taken as necessitating face-to-face contact.

It will be found that when the assembly is withdrawn from the molten solder and allowed to cool, the sheets will be firmly bonded together by solder.

The invention may be used to bond a metallised vitreous sheet to a second sheet which comprises at least portions of any solderable metal.

The invention can be applied in the fabrications of various types of articles. For example it may be applied in the manufacture of window panes and screens, in which case said second sheet will also be a metallised vitreous sheet.

It is well known that stained glass leaded windows of ancient buildings such as cathedrals which may be several hundreds of years old have deteriorated in the course of time and that this deterioration is accelerating as a consequence of the rise in atmospheric pollution in modern times. Proposals have been made to protect such windows from the atmosphere outside the building in which they are incorporated by covering the whole window with a sheet of clear glass. In the case of large windows this is inconvenient because of the size and weight of the clear glass sheet, and in any event, some additional frame is required which may detract from the external appearance of the building. It has further been proposed to glue each element (whether stained or not) of the leaded window to a clear glass sheet and to insert the panel thus obtained into the window. This is unsatisfactory because it is not always possible to achieve a good bond between the two vitreous elements using a clear glue, since the original element from the window often has an irregularly shaped surface. It would of course be possible to grind flat the original element, but this would alter its colour or tone and there would always be the risk of breaking it.

Accordingly, in certain preferred embodiments of the present invention, said first sheet is of stained glass and said second sheet is of clear glass, to form a double pane.

Such a double pane can readily be incorporated into a leaded window, and the metallised and soldered margins can be hidden in the leading of the window when the pane is installed. The present invention thus avoids the necessity of using a large heavy glass sheet or an additional external frame for such a sheet, and it enables a high quality bond to be formed between the vitreous elements even when one has a non planar surface, since the solder will readily fill up any irregular gaps around the margins of the elements. It has surprisingly been found that such a soldering operation involves considerably less risk of breaking even a vitreous element which is some hundreds of years old than does grinding such an element flat as has been necessary to achieve a good bond using an adhesive. Furthermore such soldering has no effect on the colour or tone of a stained glass element.

Preferably, at least said stained glass sheet is uniformly heated prior to said soldering. This substantially eliminates risk of that element being broken by thermal shock during soldering.

Advantageously, the metallised marginal zones of the elements are solder-coated prior to assembly. This promotes the formation of a high quality solder bond, and in some embodiments of the invention it is unnecessary to add any further solder, these solder coatings simply being melted in situ in order to form the bond.

Since the panes in view in this aspect of the invention are generally of small size as compared with other types of window pane, indeed it is rare for a leaded window pane to have an area greater than $0.1 m^2$, it is especially suitable to hold the assembly with a clamp and totally immerse it in the solder bath.

Said clear glass sheet is preferably a thin glass sheet, that is, less than 3 mm thick. It may for example be 1 to 2 mm thick.

It will be appreciated that it is within the scope of the invention to provide an additional clear glass sheet with metallised margins and to solder bond the stained glass sheet between the two clear sheets. In that case, the three sheet assembly can be bonded together in one stage by dipping.

The invention may also be applied in the manufacture of glazing panels where at least one of the sheets bears a coating for modifying the optical or electrical properties of the vitreous material, e.g. for modifying the reflectance characteristics of the vitreous material in respect of infrared, visible or ultra-violet radiation or for rendering the pane or screen electrically conductive so that it constitutes a radio autenna or so that it may be heated by Joule effect for de-misting or de-icing.

In some preferred embodiments of the invention, one or more electrical circuit components is or are assembled between said sheets which thus constitute an envelope.

The invention can thus be applied in the manufacture of display devices of many different kinds, notable examples being instrument panels for vehicles and other machines, television screens and numeric and other displays for electrical and electronic instruments such as calculators and time recording devices.

It is not necessary for the two sheets to be planar, or indeed of the same shape. For example one sheet may be flat and the other dished and provided with marginal flanges for soldering. In this way, a desired spacing between the sheets may be achieved. Nor is it necessary that the surfaces of the sheets should be flat, for example one sheet could be of figured glass. As the assembly is immersed in molten solder, the solder will readily fill irregularities due to the figuring between the figured glass sheet and the other sheet.

In some preferred embodiments of the invention, the whole assembly is immersed in molten solder. This is especially convenient when the assembly is of relatively small size.

In other preferred embodiments of the invention in which the sheets are to be united by their margins, the marginal zones only of the assembly are immersed in molten solder. This is especially convenient for assemblies of relatively large size since it does not require such a large bath of molten solder.

Within the broad field of display devices to which the invention can be applied there are numerous types functioning on different principles. The following is a list of some of them:

(a) Gas discharge devices comprising a system of electrodes permitting localised break down of gas and light emission responsive to electrical signals distributed across the system in accordance with the required display (b) Vacuum fluorescent devices incorporating cathode ray tubes with phosphor-coated anodic display segments which can be selectively energised by voltage signals (c) Liquid crystal devices incorporating a partially ordered fluid having electro-optical properties (d) Electroluminescent devices incorporating a phosphor layer which is disposed between electrodes and emits a light image responsive to appropriately energising signals delivered by a scanner (e) Electrophoretic displays comprising light-reflecting particles which are suspended in a liquid medium and which become displaced through such medium into effective display position under the influence of display-wise distributed energising signals (f) Magnetic display devices comprising spherical particles which have light-reflecting and non-light-reflecting aspects and which in any given zone of the device can be moved into light-reflecting display orientation by the action of electromagnetic signals (g) Light-emitting diode devices comprising semi-conductors which emit light when fed with electric current (h) Incandescent filament devices disposed in dot array and energisable in display configuration by signalling voltages applied at appropriate positions in the array.

(i) Photoconductor controlled light-valve devices comprising an electro-optic film emitting display signals responsive to light signals.

Panels formed according to the present invention can be employed with advantage as the envelopes of devices of each of the foregoing types.

Brief descriptions of devices of the foregoing types are to be found e.g. in a report by Alan Sobel entitled "Electronic Numbers" published in Scientific American of June 1973, Volume 228 No. 6, in Proceedings of the IREE, July 1973, pages 907 to 915; in the Record of the IEEE 1976 Biennial Display Conference held 12th to 14th October 1976; and in the Digest of Technical Papers read at the SID International Symposium, published by Lewis, New York (First Edition: May 1976).

In another type of use, the panel according to the invention can contain electric or electronic or microelectronic circuitry. Such circuitry is usually composed of different electrical components such as transistors, resistors, capacitors, amplifiers, etc. connected together by conductor lines. The components and the conductor lines are deposited on a substrate, generally by vacuum deposition techniques for elaborate circuitry or by silk screening techniques for less elaborate circuitry. The circuitry may be deposited on one or more substrates which are introduced into the envelope according to the invention. Instead of or in addition to using a separate substrate or separate substrate(s) the circuitry may be deposited on one or both of the components forming the envelope walls.

Particular importance is attached to embodiments of the invention wherein the envelope is hermetically sealed and contains gas of special composition and/or at subatmospheric pressure. Examples of such devices are those of types a, b and h in the foregoing list.

The invention can also be applied to solar panels.

The invention includes an assembly which has been soldered together to form a unit by a method as herein defined.

In some embodiments of the invention, said unit is a glazing unit.

In other embodiments of the invention, said unit is a fluid flow directing unit.

Fluid flow directing units formed by a method according to the invention are themselves believed to be new, and accordingly, the present invention further extends to a fluid flow directing unit defining passages for the flow of fluid currents, characterised in that it comprises a stack of at least three vitreous sheets secured to intervening metallic spacers by solder joints, such spacers defining fluid flow paths through the unit between the sheets.

Such a unit can be rapidly and economically manufactured, and since the sheets are of vitreous material they will not corrode.

Such a unit is for example useful as a heat-exchange assembly for an air-conditioning system.

The various fluid flow paths may be mutually oriented in any desired way, for example they may all be parallel, or one or more of said paths may be at right angles to one or more others.

The present invention also provides a pane for incorporation into a leaded window which comprises a first vitreous element and a second clear vitreous element of substantially similar size and shape to the first each having metallised margins which are soldered together.

The invention extends to a leaded window incorporating a pane as herein defined.

The invention will now be described in greater detail with reference to the accompanying diagrammatic drawings in which.

It should be appreciated that the drawings are not to scale: in particular, in FIGS. 1, 2 and 9 to 12 the thicknesses of metallic coatings at the margins of the vitreous sheets shown are greatly exaggerated, as is the quantity of solder used, and in FIGS. 1 to 5, the thickness of the metallic spacer strip material is also greatly exaggerated.

Figure 1:
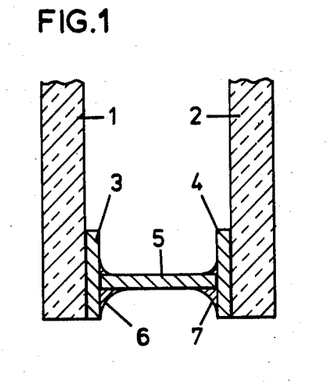
FIGS. 1 and 2 are detail cross-sections of edge portions of soldered double glazing units manufactured in accordance with the invention.

In FIG. 1, two vitreous sheets 1, 2 have metallic deposits 3, 4 formed around their margins. These margins may be metallised using copper. A flat metallic spacer strip 5 which had previously been formed into a spacing frame and then applied to the metallised margin of the first sheet 1 is soldered to that margin by a solder bead 6 and to the margin 4 of the second sheet 2 by a solder bead 7.

Figure 2:
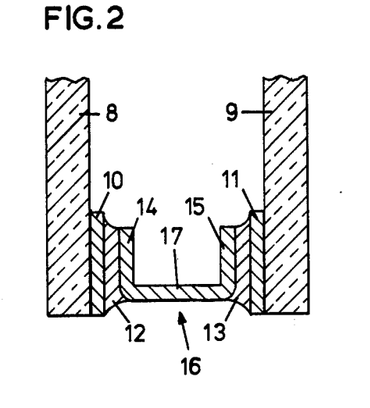

In FIG. 2, two vitreous sheets 8,9 have metallised margins 10, 11 to each of which is attached, by a solder layer respectively 12, 13, a flange 14, 15 of a U-section spacer 16 which has a web 17 defining the spacing of the sheets.

Figure 3:
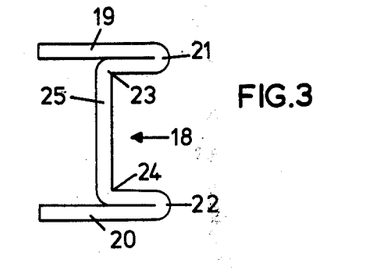
FIGS. 3 to 5 are end elevations of various alternative forms of metallic spacer strip material.

FIG. 3 shows an I-section spacer 18 formed from a flat metal strip by bending. Such bending can be performed in the following way: flange portions 19, 20 to each edge of the flat strip are bent double against the same side of the body of the strip at bends 21, 22; these doubled portions are then gripped and bent back in the opposite direction along bend lines 23, 24 at opposite edges of the web 25 of the spacer thus formed. In order to make the spacer a true I-section, it may be coated with solder (not shown) e.g. by dipping, in such a way that the doubled portion of each flange 19, 20 is rendered solid.

Figure 4:
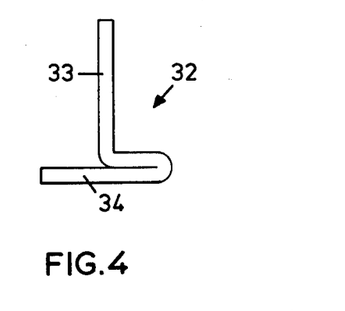

FIG. 4 shows a T-section spacer 32 having a web 33 and a flange 34. It will be apparent from the drawing that this spacer can be formed from a flat strip of metal in a way which is similar to the method of forming the I-section spacer shown in FIG. 3.

Figure 5:
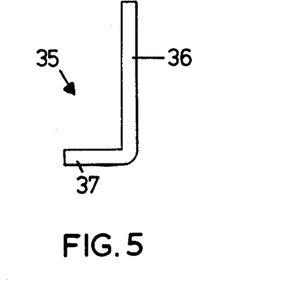

FIG. 5 shows an L-section spacer 35 having a web 36 and a single flange 37 formed by bending a flat strip of metal.

When a flanged spacer such as is shown in any of FIGS. 2 to 5 is used in the manufacture of a soldered panel unit according to this invention, it will be appreciated that such a spacer may be assembled between the sheets with the free end(s) of its flange(s) directed towards or away from the edge of the assembly. In particular, the spacer 16 shown in FIG. 2 can be rearranged so that its flanges 14, 15 have their free ends towards the edges shown of the sheets 8, 9.

When a spacer such as is shown in any of FIGS. 1 to 5 has been formed it is preferably coated with a layer of solder metal. This can most conveniently be done by dipping the spacer in a bath of molten solder. Individual spacers may be dipped singly or in groups as in a batch process, or the spacer material may be led through a bath of solder as in a continuous process, prior to cutting to length, or even prior to the formation of any flanges.

The thickness of the solder coating thus applied is preferably between 2 and 20 microns.

The metallised margins of the vitreous sheets to which a said spacer is to be soldered are also preferably coated with solder. This may for example by done by spraying as is well known. The thickness of a solder coating on a sheet margin is preferably between 50 and 200 microns.

Figure 6:
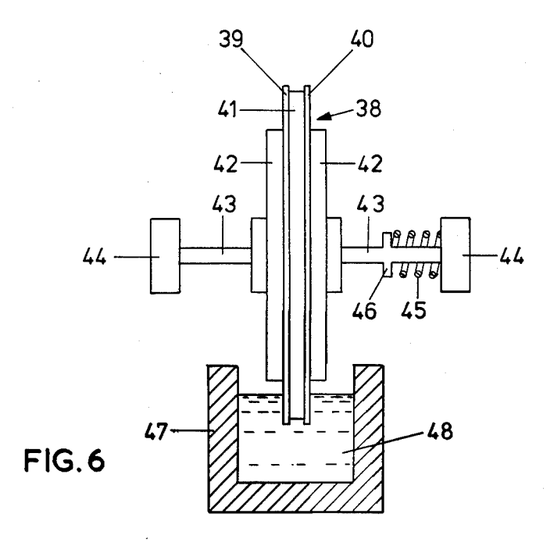
FIGS. 6 and 7 show various ways in which a glazing assembly may be bonded together.

FIG. 6 illustrates a solder-bonding method in accordance with the invention. It is not necessary that solder should be pre-applied to the spacer(s) or sheet margins of the unit. In FIG. 6, an assembly 38 of two vitreous sheets 39, 40 (whose margins have been metallised) and a spacer 41 is held in a clamping mechanism. The clamping mechanism comprises a pair of buffer plates 42 mounted on axles 43 carried by bearings 44 which are a fixed distance apart. A spring 45 acts between one of the bearings 44 and a projection 46 on one of the axles 43 to urge the buffer plates 42 together thus exerting a clamping force on the assembly 38. The clamping mechanism is arranged above a bath 47 containing molten solder 48.

When a margin of the assembly is dipped in the bath, the molten solder will flow between a spacer flange (where present) and the adjacent sheet by capillary action to form a thin intervening layer. It has also been found that, in the case where a single-flanged or unflanged spacer is used, (see for example FIGS. 1, 4 and 5) a good quality bead can be formed between the edge of the spacer web and its adjacent margin. Any excess solder can be brushed or wiped off.

In order to dip the other margins of the assembly, it is preferred to raise the assembly, rotate it about the axles 43 and then lower it again. Preferably, the assembly is rotated as it is lifted so that the just-dipped margin is inclined to the horizontal as it leaves the surface of the solder in the bath. In this way excess solder can run off easily, and surface tension effects as the spacer is withdrawn from the bath of solder can promote smooth, uniform, high quality joints between the spacer and the sheet margins.

It will of course be appreciated that the material of which the bath 47 is made should be such that it will not dissolve in the molten solder 48 so as to affect its composition, and the buffer plates 42 should likewise be resistant to the molten solder especially if the dimensions of the apparatus are such that they will be dipped in the bath. Such buffer plates 42 may for example be made of glass.

In a variant assembly edge dipping process (not shown in the drawings), the assembly is held together by edge clamps, and is lifted out of the bath, rotated, and reinserted to effect solder-bonding of its margins.

Figure 7:
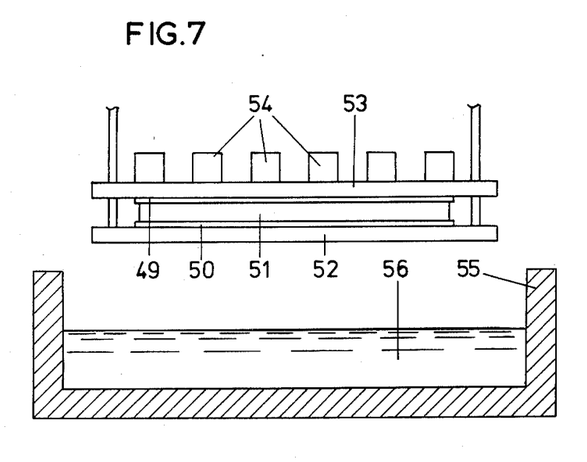

FIG. 7 illustrate an alternative solder-bonding method according to the invention. In FIG. 7, an assembly of two vitreous sheets 49, 50 (whose margins have been metallised) and a spacer 51, is laid horizontally on a support 52, and a clamping plate 53 is lowered on top of the assembly. The clamping plate 53 is charged with weights 54 so that it exerts the desired clamping force on the assembly. The support 52 is then lowered into a bath 55 containing molten solder 56. In this way, all edges of the glazing unit can be solder-bonded simultaneously. Again, the various parts of the apparatus which are to come into contact with the molten solder should be such that they will not affect its composition, e.g. by dissolving.

Figure 8:
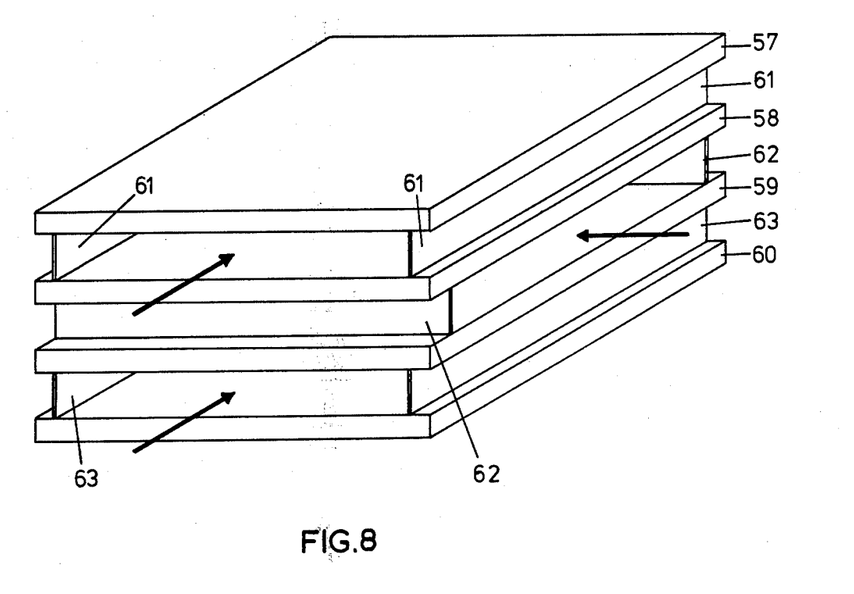
FIG. 8 shows a fluid flow directing unit constructed in accordance with the invention.

FIG. 8 illustrates, in perspective view, a fluid flow directing unit constructed in accordance with the invention. This unit comprises four vitreous sheets 57, 58, 59, 60 held spaced apart by three pairs of spacers 61, 62, 63 intervening between and soldered to metallised margins of the sheets.

The first and second sheets 57, 58 and their intervening pair of spacers 61 define a first fluid flow path, the second and third sheets 58, 59 and their intervening pair of spacers 62 define a second fluid flow path, and the third and fourth sheets 59, 60 and their intervening pair of spacers 63 define a third fluid flow path. As shown in the drawing, the first and third paths are parallel, and the second path lies between and at right angles to them.

Fluid flowing along the second path will therefore be in indirect heat-exchange relationship with fluid flowing along the first path and/or the third path.

In a variant embodiment, the second pair of spacers is positioned parallel to the first and third pair of spacers, so that all three fluid flow paths are parallel. In use, the arrangement may be such that fluid flows along this second path in the opposite direction to fluid flowing along the first and third paths.

Any desired number (not less than three) of sheets may be used.

Such a unit may be manufactured simply and economically by a solder dipping process as described.

Figure 9:
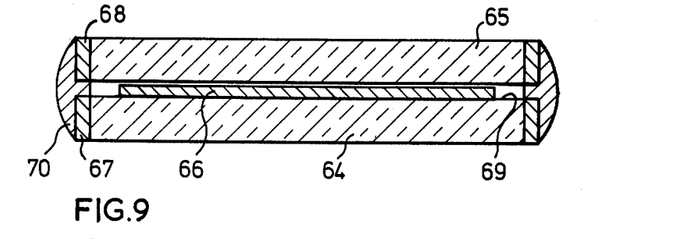
FIGS. 9, 10 and 11 are cross-sectional views of three embodiments of unit made in accordance with the invention.

The window pane shown in FIG. 9 is composed of two glass sheets 64, 65 of which the first is covered with a thin metallic layer 66 e.g. of silver for reducing light transmission through the window. The edges of the sheets are metallised with thin film 67, 68 e.g. of copper or a copper alloy using any convenient technique, e.g. by flame spraying. The layer 66 of silver which was deposited before the metallising film 67 is insulated therefrom by a gap 69.

The two sheets 64, 65 are assembled in register with their metallised coatings 67, 68 facing one another, are clamped in position and the edges of the assembly are dipped in a bath of molten solder (not shown). On removal from the bath and after cooling it is found that solder has solidified to form a layer 70 firmly bonded to the metallising coatings 67, 68 and thus uniting the two sheets of glass.

In a variant of this embodiment, a metallic coating such as the layer 66 is used as a heating element. Relatively thick strips (not shown) are laid at opposite edges of the coating layer and these are provided with current lead-in wires. These lead-in wires are led through the solder layer 70 and may be insulated therefrom by metallised glass tubes to which the solder in the layer bonds.

Figure 10:
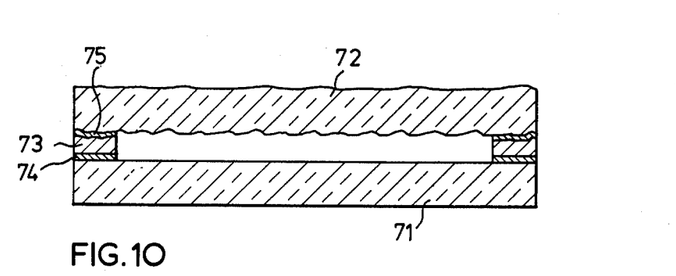

FIG. 10 shows a second embodiment in which a flat planar glass sheet 71 is soldered to a second, figured glass sheet 72 by a solder layer 73 adhering to metallising layers 74, 75 deposited on the two sheets. It will be noted that the solder layer 73 fills in the irregularities in the figured surface of the second glass sheet 72.

Figure 11:
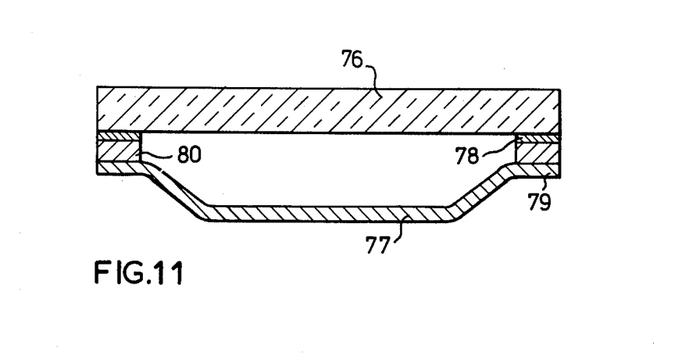

FIG. 11 shows a third embodiment in which a flat glass sheet 76 is bonded to a metal sheet 77. Marginal zones of the glass sheet 76 are metallised with a film 78 e.g. of copper. The metal sheet 77 is dished and is provided with a rim flange 76 for registering with the metallised margins 78 of the glass sheet.

The two sheets are assembled in register and at least the edges of the assembly are dipped in a bath of molten solder so that on withdrawal and cooling they are firmly bonded together by a solder layer 80.

Such a unit may be used as casing for a display unit.

The units illustrated in FIGS. 9 to 11 may for example be made using the apparatus illustrated in FIG. 6 or 7.

Figures 12, 13:
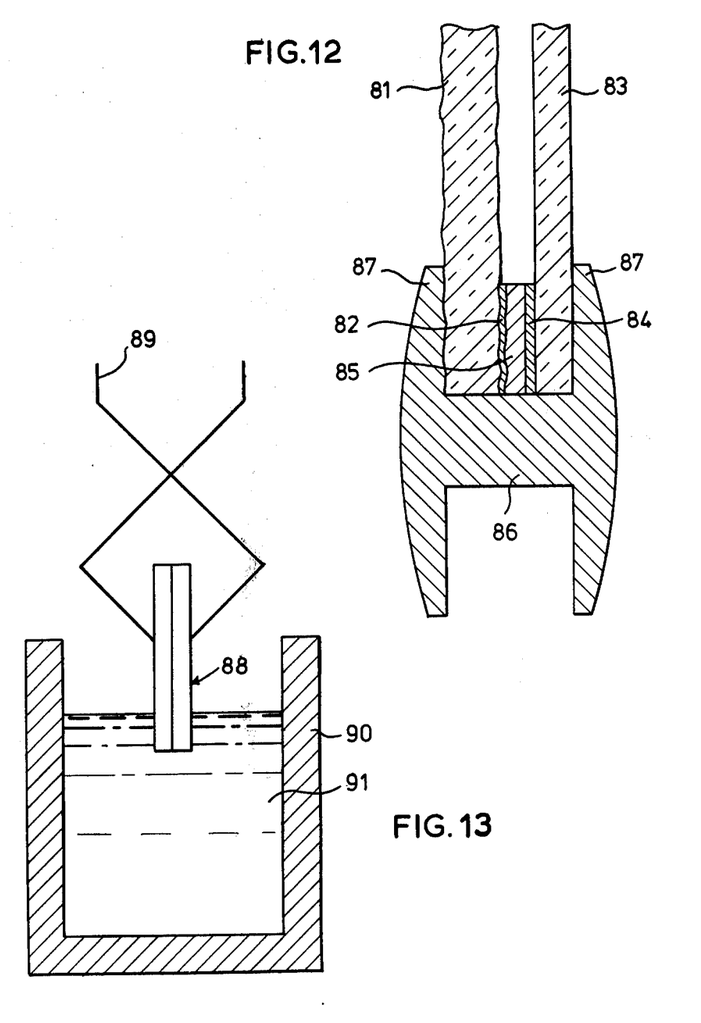
FIG. 12 is a detail cross-section of a pane according to the invention incorporated in a leaded window.
FIG. 13 illustrates a method of preparing the pane of FIG. 12.

In FIG. 12 a first vitreous element 81 has a metallic coating 82, e.g. of copper, deposited in known manner around its margin. A second, clear vitreous element 83 of similar size and shape to the first element also has a metallic coating 84 around its margin, and the elements are bonded together at their margins by a body of solder 85. It will be appreciated that the thicknesses of the solder 85 and metallic coatings 82, 84 are exaggerated in the drawings, and further that the two vitreous elements will normally be in contact over at least part of their area. Such a pane is secured in a leaded window using conventional H-section lead strip 86. It will be noted that in the embodiment illustrated, the lips 87 of the strip 86 mask the metallised and soldered margins of the first and second vitreous elements. The first element 81 may for example be of stained glass, and it will be protected on the side of the second element 83 from deterioration due to weathering. The second element 83 is suitably of clear glass 1 or 2 mm thick.

In FIG. 13, an assembly generally indicated at 88 comprising first and second vitreous elements (such as the elements 81, 83 of FIG. 1) which have metallised margins (not shown), is held by a clamp diagrammatically shown at 89 for insertion into a bath 90 containing molten solder 91. In the course of immersion in the solder, the solder will creep between the vitreous elements of the assembly 88. On withdrawal from the bath solder will remain around the metallised margins of the elements since these will be wetted by the molten solder, and on cooling, the elements will be bonded together to form a pane. If desired, flux may be applied to the metallised margins prior to dipping and also, these margins may be pre-coated with solder.

Figure 14:
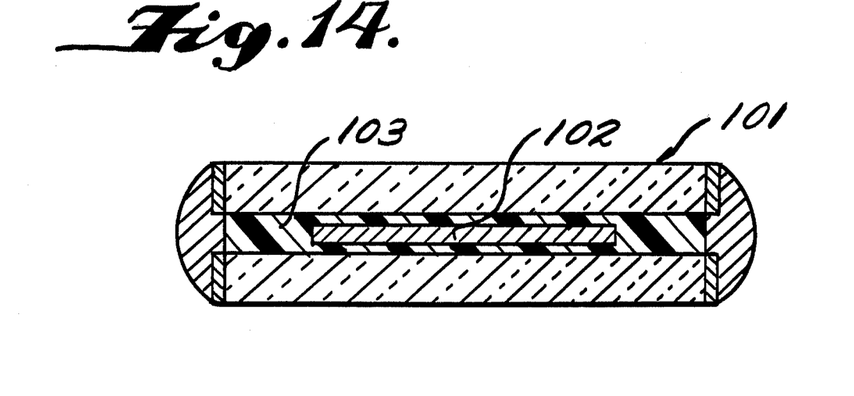
FIG. 14 is a cross-sectional view of a solar panel.
Figure 15:
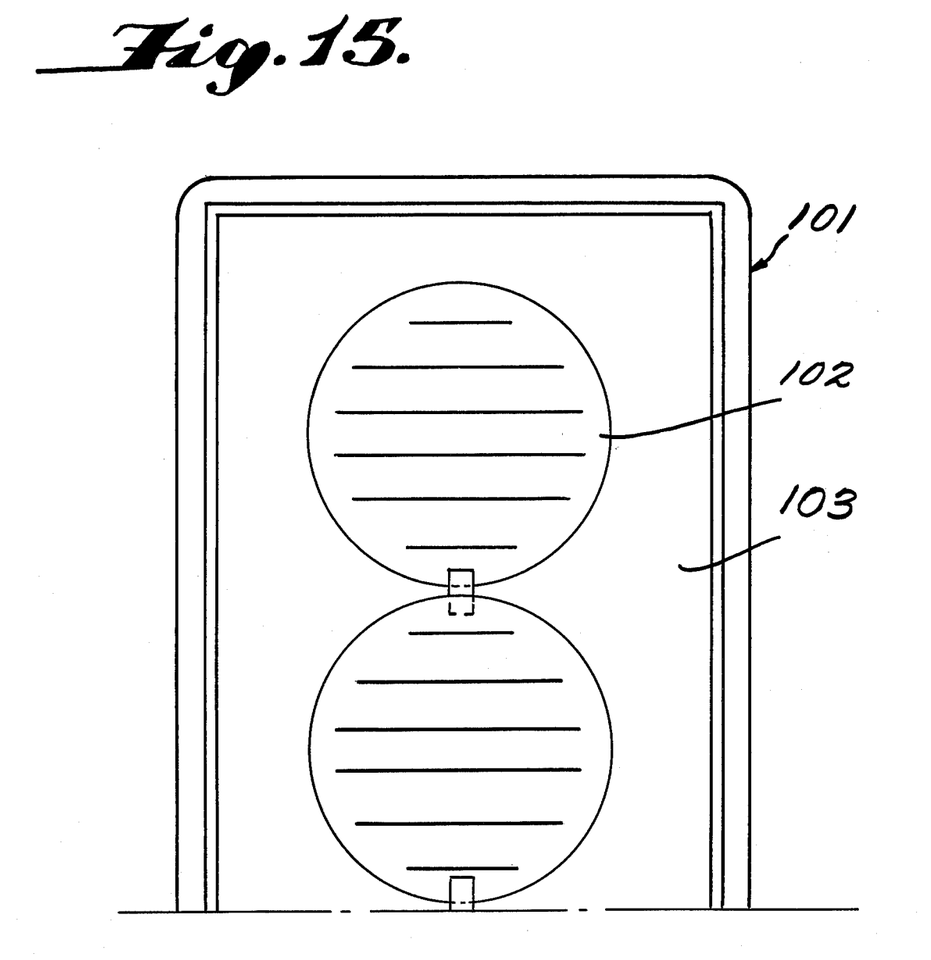
FIG. 15 is a partial front view of a solar panel.

FIGS. 14 and 15 illustrate a solar panel 101 containing a plurality of solar energy transducers in the form of photovoltaic cells 102 embedded in plastics material 103. A metallic spacer comprising a web having a width greater than its thickness, the width governing the spacing, may be used in a corresponding embodiment of a housing for solar energy transducers.

We claim:

1. A method of manufacturing a panel unit comprising the steps of assembling a first, vitreous sheet, and at least one other sheet held in spaced relation by at least one elongated metallic spacer intervening between metallic or metallised portions of each successive pair of sheets thereby forming an elongated joint region between each sheet and said spacer, said spacer comprising a web having a width greater than its thickness, said width of the spacer web governing the extent of sheet separation, and then dipping the elongated joint regions of the thus obtained assembly in a bath of molten solder.

2. A method according to claim 1, wherein said spacer contacts said sheets at elongate joint regions extending along substantially the full length of at least one side edge margin of the sheets, and wherein said regions are dip-soldered as a whole.

3. A method according to claim 1 or 2, wherein said joints regions extend around substantially the whole margin of the sheets.

4. A method according to claim 1, wherein said panel unit is a hollow panel unit.

5. A method as in claim 1 wherein said bath of solder is maintained at a temperature between 20° C. and 100° C. above the liquidus temperature of the solder used in the bath.

6. A method as in claim 1 wherein the solder in said bath is a lead/tin alloy.

7. A method as in claim 6 wherein said solder contains by weight, between 60% and 35% lead.

8. A method as in claim 6 or 7 wherein said solder contains at least 15% tin and at most 40% bismuth by weight.

9. A method as in claim 1 including applying flux to said joint regions prior to dipping.

10. A method as in claim 1 wherein at least one of said sheets is surface-coated with solder at least over its respective joint region prior to dipping.

11. A method as in claim 10 wherein said solder coating is effected using a solder alloy of the same composition as the solder of said bath.

12. A method as in claim 1 wherein said spacer is formed from a flat metal strip.

13. A method as in claim 1 wherein said spacer has at least one flange portion for soldering in face-to-face relation with one of said sheets.

14. A method as in claim 1 wherein said spacer is formed of an Invar alloy.

15. A method as in claim 1 wherein said spacer is formed of a Kovar alloy.

16. A method as in claim 1 including heating said vitreous sheet prior to dipping in said bath of molten solder.

17. A method as in claim 1 including giving said spacer a metallic coating of a composition different from the spacer.

18. A method as in claim 17 said coating is tin.

19. A method as in claim 1 including assembling at least one electrical component between said sheets.

20. A method as in claim 19 wherein said electrical component is a solar energy transducer.

21. A method as in claim 1 wherein said other sheet is a metal sheet.

22. A method as in claim 1 wherein said other sheet is a vitreous sheet, each of said sheets being metallised in the respective joint region.

* * * * *